(12) United States Patent
Liu et al.

(10) Patent No.: US 11,443,436 B2
(45) Date of Patent: Sep. 13, 2022

(54) INTERACTIVE IMAGE MATTING METHOD, COMPUTER READABLE MEMORY MEDIUM, AND COMPUTER DEVICE

(71) Applicant: GAODING (XIAMEN) TECHNOLOGY CO. LTD, Xiamen (CN)

(72) Inventors: Zhijie Liu, Xiamen (CN); Jiexing Lin, Xiamen (CN); Baokun Zhang, Xiamen (CN); Limin Zhang, Xiamen (CN)

(73) Assignee: GAODING (XIAMEN) TECHNOLOGY CO. LTD, Xiamen (CN)

( * ) Notice: Subject to any disclaimer, the term of this patent is extended or adjusted under 35 U.S.C. 154(b) by 174 days.

(21) Appl. No.: 16/929,139

(22) Filed: Jul. 15, 2020

(65) Prior Publication Data

US 2020/0349716 A1  Nov. 5, 2020

Related U.S. Application Data

(63) Continuation of application No. PCT/CN2019/102621, filed on Aug. 26, 2019.

(30) Foreign Application Priority Data

Aug. 26, 2018 (CN) .......................... 201810997105.7

(51) Int. Cl.
*G06T 7/13* (2017.01)
*G06T 7/187* (2017.01)
(Continued)

(52) U.S. Cl.
CPC ................ *G06T 7/187* (2017.01); *G06T 7/13* (2017.01); *G06T 7/194* (2017.01); *G06T 7/90* (2017.01);
(Continued)

(58) Field of Classification Search
CPC .......... G06T 7/13; G06T 7/187; G06T 7/194; G06T 7/90; G06T 15/005; G06V 10/751
See application file for complete search history.

(56) References Cited

U.S. PATENT DOCUMENTS

2006/0239548 A1* 10/2006 George Gallafent ..... G06T 7/11
382/164
2012/0023456 A1* 1/2012 Sun ......................... G06T 7/194
715/863

(Continued)

FOREIGN PATENT DOCUMENTS

| CN | 103177446 A | 6/2013 |
| CN | 104504745 A | 4/2015 |

(Continued)

OTHER PUBLICATIONS

Shahrian et al. ("Improving Image Matting Using Comprehensive Sampling Sets," IEEE Conference on Computer Vision and Pattern Recognition; Date of Conference: Jun. 23-28, 2013) (Year: 2013).*

(Continued)

*Primary Examiner* — Yubin Hung

(57) ABSTRACT

The present disclosure provides an interactive image matting method, a computer readable memory medium, and a computer device. The interactive image matting method includes steps: obtaining an original image; collecting foreground sample points on a hair edge foreground region of the original image and collecting background sample points on a hair edge background region of the original image by a human-computer interaction method to correspondingly obtain a foreground sample space and a background sample space; receiving a marking operation instruction input by a user, and smearing a hair region of the original image according to the marking operation instruction to mark unknown regions; traversing the unknown regions to obtain a pixel of each unknown region, traversing all the sample (Continued)

pairs to select a sample pair with a minimum overall cost function value for the pixel of each unknown region.

19 Claims, 4 Drawing Sheets

(51) Int. Cl.
  *G06T 7/194* (2017.01)
  *G06V 10/75* (2022.01)
  *G06T 7/90* (2017.01)
  *G06T 15/00* (2011.01)
(52) U.S. Cl.
  CPC .......... *G06T 15/005* (2013.01); *G06V 10/751* (2022.01)

(56) References Cited

U.S. PATENT DOCUMENTS

| | | | | |
|---|---|---|---|---|
| 2012/0075331 A1* | 3/2012 | Mallick | ................ | A45D 44/005 345/594 |
| 2012/0294519 A1* | 11/2012 | He | .......................... | G06T 7/194 382/164 |
| 2017/0278246 A1 | 9/2017 | Kim | | |
| 2018/0189935 A1* | 7/2018 | McHugh | ................... | G06T 5/20 |
| 2018/0225827 A1* | 8/2018 | Aksoy | ....................... | G06T 7/11 |
| 2018/0365813 A1* | 12/2018 | Leong | ....................... | G06T 7/11 |

FOREIGN PATENT DOCUMENTS

| | | |
|---|---|---|
| CN | 105809666 A | 7/2016 |
| CN | 106846336 A | 6/2017 |
| CN | 107516319 A | 12/2017 |
| CN | 109389611 A | 2/2019 |

OTHER PUBLICATIONS

Huang et al. ("A new alpha matting for nature image," Seventh International Conference on Natural Computation; Date of Conference: Jul. 26-28, 2011) (Year: 2011).*
International Search Report issued in corresponding international application No. PCT/CN2019/102621, dated Nov. 27, 2019(5 pages).
International Searching Authority issued in corresponding International application No. PCT/CN2019/102621, dated Nov. 27, 2019(4 pages).

* cited by examiner

INTERACTIVE IMAGE MATTING METHOD, COMPUTER READABLE MEMORY MEDIUM, AND COMPUTER DEVICE

CROSS-REFERENCE TO RELATED APPLICATION

The present application is a continuation-application of International (PCT) Patent Application No. PCT/CN2019/102621, titled "INTERACTIVE IMAGE MATTING METHOD, MEDIUM, AND COMPUTER APPARATUS," filed on Aug. 26, 2019, which claims foreign priority of Chinese Patent Application No. 201810997105.7, filed on Aug. 29, 2018, and the entire contents of which is hereby incorporated by reference.

TECHNICAL FIELD

The present disclosure relates to a technical field of image processing, and in particular to an interactive image matting method, a computer readable memory medium, and a computer device.

BACKGROUND

Matting is one of the most commonly done operations in image processing, which refers to a process of operation of extracting required portions of an image from a picture.

During actual matting operations, when processing images including human hair, animal hair, and the like, each image needs to spend a significant amount of time and effort by a user if the matting is done manually without assistance of any tools. Thus, in order to solve a problem of difficult matting of such images, present matting techniques propose sampling methods such as Knockout, Robust Hunting, etc., to improve efficiency of the user to perform matting on target images. However, most of these sampling methods are very complex, requiring the user has rich technology on PHOTOSHOP (PS) and color channel knowledge, which is difficult for beginners.

SUMMARY

In view of the above technical problems, in order to solve at least one of the technical problems in a certain degree, a first object of the present disclosure is to provide an interactive image matting method for realizing determination of sample pairs and unknown regions through simple interaction with a user, and then calculating an alpha value of a pixel of each unknown region according to corresponding sample pair, so that the user has no need to have rich technology on PHOTOSHOP (PS) and color channel knowledge, but also performs high-quantity matting on a hair edge.

A second object of the present disclosure is to provide a computer readable memory medium.

A third object of the present disclosure is to provide a computer device.

To achieve the above objects, a first aspect of one embodiment of the present disclosure provides the interactive image matting method, including following steps:

obtaining an original image;

collecting foreground sample points on a hair edge foreground region of the original image and collecting background sample points on a hair edge background region of the original image by a human-computer interaction method to correspondingly obtain a foreground sample space and a background sample space; any one of the foreground sample points in the foreground sample space and any one of the background sample points in the background sample space form a sample pair;

receiving a marking operation instruction input by a user, and smearing a hair region of the original image according to the marking operation instruction to mark unknown regions;

traversing the unknown regions to obtain a pixel of each unknown region, traversing all the sample pairs to select a sample pair with a minimum overall cost function value for the pixel of each unknown region, and calculating an alpha value corresponding to the pixel of each unknown region according to the sample pair with the minimum overall cost function value for the pixel of each unknown region; and obtaining an alpha mask image according to the alpha value corresponding to the pixel of each unknown region, and processing the alpha mask image according to the alpha value corresponding to the pixel of each unknown region to obtain a final alpha mask image.

According to the interactive image matting method of one embodiment of the first aspect of the present disclosure, the original image is obtained firstly. The foreground sample points are collected on the hair edge foreground region of the original image by the human-computer interaction method to obtain the foreground sample space, and the background sample points are collected on the hair edge background region of the original image by the human-computer interaction method to obtain the background sample space. Any one of the foreground sample points in the foreground sample space and any one of the background sample points in the background sample space form the sample pair. Then the marking operation instruction input by the user is received, and the hair region of the original image is smeared according to the marking operation instruction to mark the unknown regions. The unknown regions is traversed to obtain the pixel of each unknown region, all the sample pairs are traversed to select the sample pair with the minimum overall cost function value for the pixel of each unknown region, and the alpha value corresponding to the pixel of each unknown region is calculated according to the sample pair with the minimum overall cost function value for the pixel of each unknown region. The alpha mask image is obtained according to the alpha value corresponding to the pixel of each unknown region, and the alpha mask image is processed according to the alpha value corresponding to the pixel of each unknown region to obtain the final alpha mask image. The determination of the sample pairs and the unknown regions are achieved through simple interaction with the user, and then the alpha value of the pixel of each unknown region is calculated according to corresponding sample pair, so that the user has no need to have the rich technology on the PHOTOSHOP (PS) and the color channel knowledge, but also performs high-quantity matting on the hair edge.

In addition, the first aspect of one embodiment of the present disclosure provides the interactive image matting method, further including following technical features.

Furthermore, the step of obtaining the foreground sample space and the background sample space includes:

receiving a first sample point acquisition instruction input by the user, and collecting the foreground sample points on the hair edge foreground region of the original image according to the first sample point acquisition instruction to obtain a plurality of the foreground sample points, the plurality of the foreground sample points form the foreground sample space; and receiving a second sample point acquisition instruction input by the user, and collecting the background sample points on the hair edge background region of the original image according to the second sample point acquisition instruction to obtain a plurality of the background sample points, the plurality of the background sample points form the background sample space.

Furthermore, the steps of traversing all the sample pairs to select the sample pair with the minimum overall cost function value for the pixel of each unknown region include:

S1: giving a predicted alpha value $\hat{\alpha}$ for the pixel I of each unknown region according to any one of the sample pairs;

S2: calculating a compliance of corresponding sample pair with the pixel of corresponding unknown region according to the predicted alpha value;

S3: calculating a spatial distance between the pixel I of the corresponding unknown region and the foreground sample point in the corresponding sample pair, and calculating a spatial distance between the pixel I of the corresponding unknown region and the background sample point in the corresponding sample pair;

S4: calculating the overall cost function value according to the compliance of the corresponding sample pair with the pixel of the corresponding unknown region, the spatial distance between the pixel I of the corresponding unknown region and the foreground sample point in the corresponding sample pair, and the spatial distance between the pixel I of the corresponding unknown region and the background sample point in the corresponding sample pair; and S5: obtaining the overall cost function values of all the sample pairs of the pixel of the corresponding unknown region by repeatedly performing steps S1-S4 to select one sample pair with the minimum overall cost function value for the pixel of the corresponding unknown region.

Furthermore, the predicted alpha value $\hat{\alpha}$ is obtained according to following formula:

$$\hat{\alpha} = \frac{(I - B_j)(F_i - B_j)}{\|F_i - B_j\|^2};$$

the $F_i$ is the foreground sample point in the corresponding sample pair, and the $B_j$ is the background sample point in the corresponding sample pair.

Furthermore, the compliance of the corresponding sample pair with the pixel I of the corresponding unknown region according to the predicted alpha value is obtained according to following formula:

$$\varepsilon_c(F_i,B_j)=\|I-(\hat{\alpha}F_i+(1-\hat{\alpha})B_j)\|;$$

the $\varepsilon_c(F_i, B_j)$ is the compliance of the corresponding sample pair with the pixel I of the corresponding unknown region.

Further, the spatial distance between the pixel I of the corresponding unknown region and the foreground sample point in the corresponding sample pair is obtained according to following formula:

$$\varepsilon_s(F_i)=\|X_{F_i}-X_I\|;$$

the $\varepsilon_s(F_i)$ is the spatial distance between the pixel I of the corresponding unknown region and the foreground sample point in the corresponding sample pair, the $X_{F_i}$ is a spatial position of the foreground sample point in the corresponding sample pair, and the $X_I$ is a spatial position of the pixel I of the corresponding unknown region.

Furthermore, the spatial distance between the pixel I of the corresponding unknown region and the background sample point in the corresponding sample pair is obtained according to following formula:

$$\varepsilon_s(B_j)=\|X_{B_j}-X_I\|;$$

the $\varepsilon_s(B_j)$ is the spatial distance between the pixel I of the corresponding unknown region and the background sample point in the corresponding sample pair, and the $X_{B_j}$ is is a spatial position of the background sample point in the corresponding sample.

Furthermore, the overall cost function value of the corresponding sample pair is obtained according to following formula:

$$\varepsilon(F_i,B_j)=\varepsilon_c(F_i,B_j)+w_1*\varepsilon_s(F_i)+w_2*\varepsilon_s(B_j);$$

the $\varepsilon(F_i, B_j)$ is the overall cost function value of the corresponding sample pair, the $w_1$ is a weight of the spatial distance cost function $\varepsilon_s(F_i)$, and the $w_2$ is a weight of the spatial distance cost function $\varepsilon_s(B_j)$.

Furthermore, the step of processing the alpha mask image according to the alpha value corresponding to the pixel of each unknown region to obtain the final alpha mask image includes:

denoising the alpha mask image according to the alpha value corresponding the pixel of each unknown region to obtain the final alpha mask image.

Furthermore, the step of processing the alpha mask image according to the alpha value corresponding to the pixel of each unknown region to obtain the final alpha mask image includes:

traversing the pixels of all the unknown regions, and determining whether the alpha value corresponding to the pixel of each unknown region and an alpha value corresponding to a 4-neighbor of the pixel of corresponding unknown region are all greater than a preset threshold;

if so, treating the pixel of the corresponding unknown region as a pixel to be processed; and traversing the pixels to be processed, performing an alpha value enhancement on each pixel to be processed, and forming the final alpha mask image according to alpha values corresponding to the pixels to be processed, wherein the pixels to be processed are performed the alpha value enhancement.

Furthermore, performing the alpha value enhancement on each pixel to be processed is done according to following formula:

$$\alpha = 255 * e^{\frac{log(\frac{\hat{\alpha}}{255})}{2.2}};$$

the $\alpha$ represents values of the alpha values corresponding to the pixels to be processed, and the pixels to be processed are performed the alpha value enhancement; $\hat{\alpha}$ represents original alpha values of the pixels to be processed.

Furthermore, the step of processing the alpha mask image according to the alpha value corresponding to the pixel of each unknown region to obtain the final alpha mask image further includes:

traversing the pixels to be processed, and performing color rendering on the pixels to be processed to form a color channel image corresponding to the original image; and forming a final matting result according to the final alpha mask image and the color channel image.

To achieve the above objects, a second aspect of one embodiment of the present disclosure provides the computer readable memory medium, including an interactive image matting program. The interactive image matting program is configured to be executed by a processor to achieve the interactive image matting method.

To achieve the above objects, a third aspect of one embodiment of the present disclosure provides the computer device, including a memory, the processor, and the interactive image matting program stored in the memory and configured to be executed by the processor. The interactive image matting program is executed by the processor to achieve an interactive image matting method.

DETAILED DESCRIPTION

Figure 1:
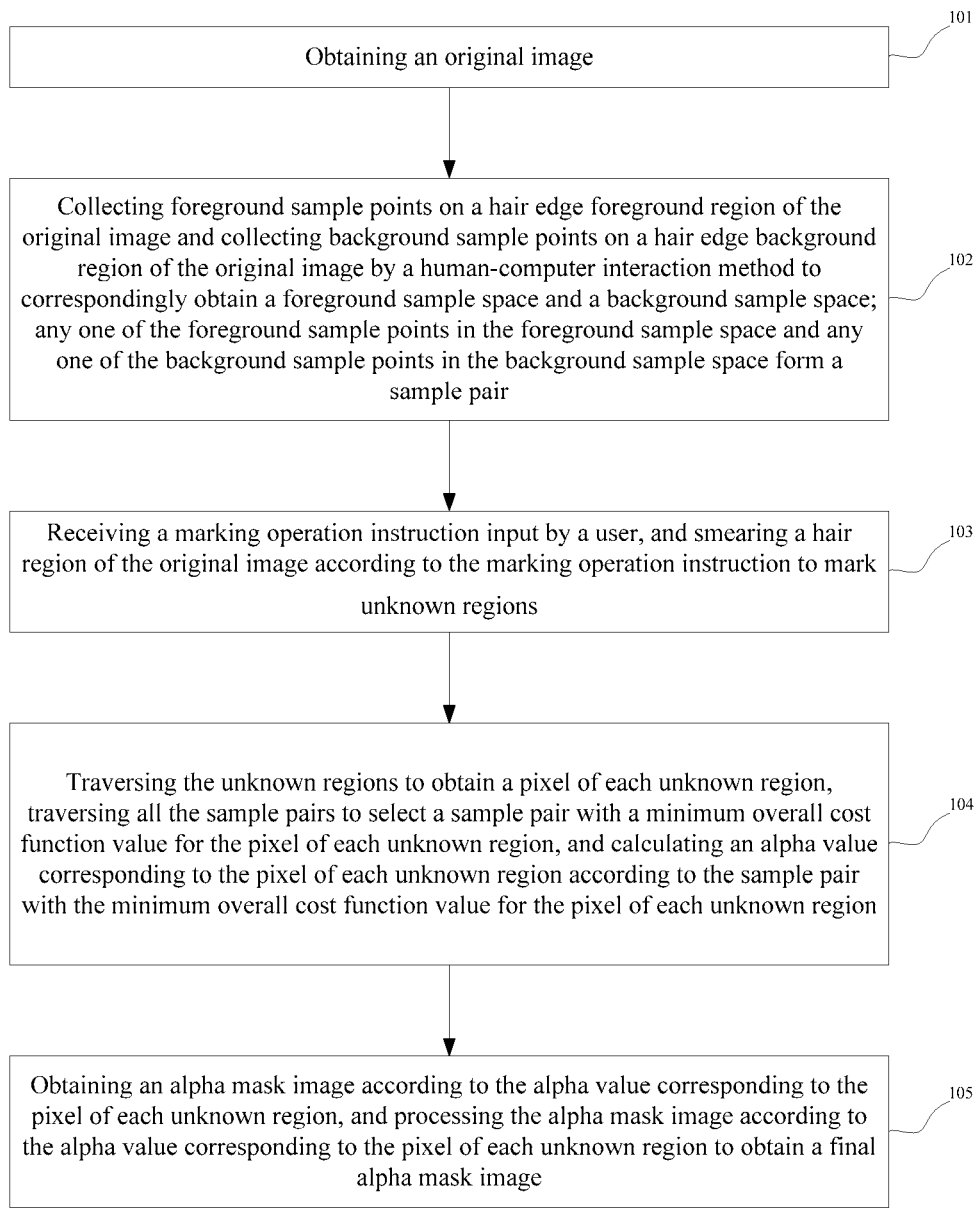
FIG. 1 is a flowchart of a first embodiment of an interactive image matting method of the present disclosure.

Embodiments of the present disclosure are described in details below. Examples of the embodiments are shown in drawings, in which same or similar reference numerals denote the same or similar elements or elements having the same or similar functions. The embodiments described below with reference to the drawings are exemplary and are intended to explain the present disclosure, but should not be construed as limiting the present disclosure.

In present image matting methods, sampling methods are very complex, requiring a user has rich technology on PHOTOSHOP (PS) and color channel knowledge, which is difficult for beginners. Thus, the present disclosure provides an interactive image matting method. In the interactive image matting method, an original image is obtained firstly. Foreground sample points are collected on a hair edge foreground region of the original image by a human-computer interaction method to obtain a foreground sample space, and background sample points are collected on a hair edge background region of the original image by the human-computer interaction method to obtain a background sample space. Any one of the foreground sample points in the foreground sample space and any one of the background sample points in the background sample space form a sample pair. Then marking operation instruction input by the user is received, and a hair region of the original image is smeared according to the marking operation instruction to mark unknown regions. The unknown regions are traversed to obtain a pixel of each unknown region, all the sample pairs are traversed to select a sample pair with a minimum overall cost function value for the pixel of each unknown region, and an alpha value corresponding to the pixel of each unknown region is calculated according to the sample pair with the minimum overall cost function value for the pixel of each unknown region. An alpha mask image is obtained according to the alpha value corresponding to the pixel of each unknown region, and the alpha mask image is processed according to the alpha value corresponding to the pixel of each unknown region to obtain a final alpha mask image. Determination of the sample pairs and the unknown regions is achieved through simple interaction with the user, and then the alpha value of the pixel of each unknown region is calculated according to corresponding sample pair, so that the user has no need to have the rich technology on the PHOTOSHOP (PS) and the color channel knowledge, but also performs high-quantity matting on the hair edge.

In order to better understand the above technical solutions, exemplary embodiments of the present disclosure are described in more details below with reference to the accompanying drawings. Although the drawings show the exemplary embodiments of the present disclosure, it should be understood that the present disclosure are implemented in various forms and should not be limited by the embodiments set forth herein. On the contrary, these embodiments are provided to make a more thorough understanding of the present disclosure and to fully convey scopes of the present disclosure to those skilled in the art.

In order to better understand the above technical solutions, the above technical solutions are described in details below in conjunction with the accompanying drawings and specific embodiments.

FIG. 1 is a flowchart of a first embodiment of the interactive image matting method of the present disclosure. As shown in FIG. 1, steps of the interactive image matting method are as following.

S101, obtaining an original image.

Original image data to be processed is obtained.

S102, collecting foreground sample points on a hair edge foreground region of the original image and collecting background sample points on a hair edge background region of the original image by a human-computer interaction method to correspondingly obtain a foreground sample space and a background sample space. Any one of the foreground sample points in the foreground sample space and any one of the background sample points in the background sample space form a sample pair.

The foreground sample points are collected on the hair edge foreground region of the original image by the human-computer interaction method to obtain the foreground sample space, and the background sample points are collected on the hair edge background region of the original image by the human-computer interaction method to obtain the background sample space. Any one of the foreground sample points in the foreground sample space and any one of the background sample points in the background sample space form the sample pair.

As an example, the step of obtaining the foreground sample space and the background sample space includes:

receiving a first sample point acquisition instruction input by the user, and collecting the foreground sample points on the hair edge foreground region of the original image according to the first sample point acquisition instruction to obtain a plurality of the foreground sample points, the plurality of the foreground sample points form the foreground sample space; and receiving a second sample point acquisition instruction input by the user, and collecting the background sample points on the hair edge background region of the original image according to the second sample point acquisition instruction to obtain a plurality of the background sample points, the plurality of the background sample points form the background sample space.

As an example, in an actual scene, a foreground acquisition instruction is obtained by the human-computer interaction method to obtain the foreground sample points $F_1$, $F_2$, $F_3$, ... $F_a$ on the hair edge foreground region of the original image. The foreground sample points, which number is a, form the foreground sample space F. A background acquisition instruction is obtained by the human-computer interaction method to obtain the background sample points $B_1$, $B_2, B_3, \ldots B_b$ on the hair edge background region of the original image. The background sample points, which number is b, form the background sample space B. Then, any one of the foreground sample points and any one of the background sample points in the background sample space form the sample pair.

S103, receiving a marking operation instruction input by the user, and smearing a hair region of the original image according to the marking operation instruction to mark unknown regions.

When the foreground sample space and the background sample space are obtained and the sample pairs are formed according to the foreground sample points and the background sample points, the marking operation instruction input by the user is received, and the hair region of the original image is smeared according to the marking operation instruction to mark the unknown regions.

The unknown regions refer to regions where hair or animal hair is difficult to peel away from the background image due to fine and confusing of the hair or the animal hair.

S104, traversing the unknown regions to obtain a pixel of each unknown region, traversing all the sample pairs to select a sample pair with a minimum overall cost function value for the pixel of each unknown region, and calculating the alpha value corresponding to the pixel of each unknown region according to the sample pair with the minimum overall cost function value for the pixel of each unknown region.

When the unknown regions are marked, the unknown regions are traversed to obtain the pixel of each unknown region. All the sample pairs formed by the foreground sample points and the background sample points are traversed to select the sample pair with the minimum overall cost function value for the pixel of each unknown region. The alpha value corresponding to the pixel of each unknown region is calculated according to the sample pair with the minimum overall cost function value for the pixel of each unknown region for the pixel of each unknown region to obtain the alpha value corresponding to the pixel of each unknown region.

S105, obtaining an alpha mask image according to the alpha value corresponding to the pixel of each unknown region, and processing the alpha mask image according to the alpha value corresponding to the pixel of each unknown region to obtain a final alpha mask image.

Figure 2:
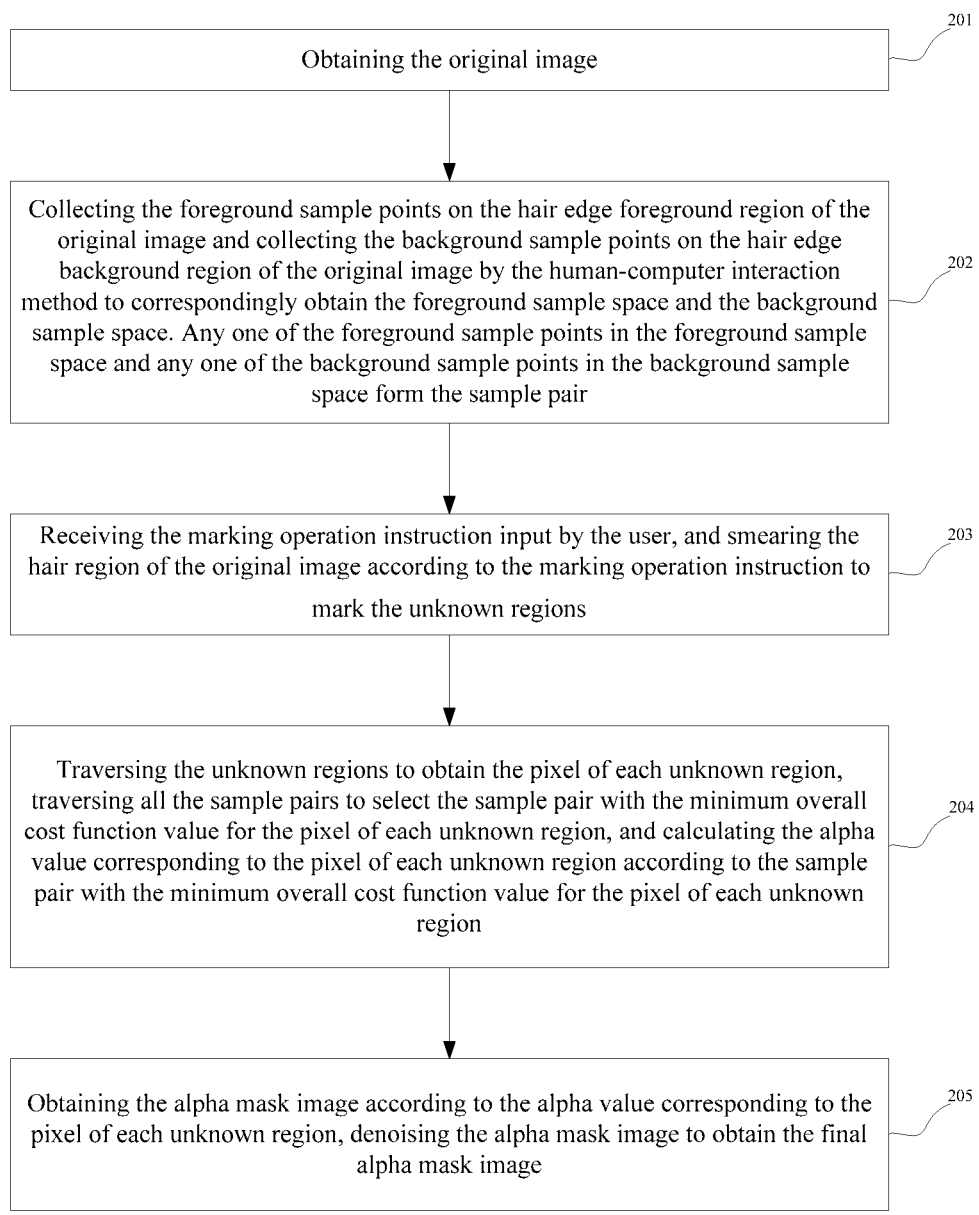
FIG. 2 is a flowchart of a second embodiment of the interactive image matting method of the present disclosure.

When the alpha mask image is obtained according to the alpha value corresponding to the pixel of each unknown region, the alpha mask image is processed according to the alpha value corresponding to the pixel of each unknown region for being adjusted to obtain the final alpha mask image, so that a matting result of performing matting according to the final alpha mask image is more clear. In a second embodiment, as shown in FIG. 2, the present disclosure provides the interactive image matting method, including following steps:

S201, obtaining the original image.

S202, collecting the foreground sample points on the hair edge foreground region of the original image and collecting the background sample points on the hair edge background region of the original image by the human-computer interaction method to correspondingly obtain the foreground sample space and the background sample space. Any one of the foreground sample points in the foreground sample space and any one of the background sample points in the background sample space form the sample pair.

S203, receiving the marking operation instruction input by the user, and smearing the hair region of the original image according to the marking operation instruction to mark the unknown regions.

S204, traversing the unknown regions to obtain the pixel of each unknown region, traversing all the sample pairs to select the sample pair with the minimum overall cost function value for the pixel of each unknown region, and calculating the alpha value corresponding to the pixel of each unknown region according to the sample pair with the minimum overall cost function value for the pixel of each unknown region.

The steps S201-S204 are consistent with the steps S101-S104, and are not repeated herein.

S205, obtaining the alpha mask image according to the alpha value corresponding to the pixel of each unknown region, denoising the alpha mask image to obtain the final alpha mask image.

When the alpha value corresponding to the pixel of each unknown region is obtained, the alpha mask image is obtained according to the alpha value corresponding to the pixel of each unknown region. Then the alpha mask image is denoised to obtain the final alpha mask image.

There are a plurality methods to denoise the alpha mask image.

As an example, first, a guide image G corresponding to the alpha mask image Q is obtained, and an autocorrelation mean value $corr_G$ and a cross-correlation mean value $corr_{GQ}$ of a square filter, which radius is r, are calculated. Then, autocorrelation variance $var_G$ and cross-correlation covariance $cov_{GQ}$ of the alpha mask image Q and autocorrelation variance $var_G$ and cross-correlation covariance $cov_{GQ}$ of the guide image G are calculated. Then, a window linear transform coefficient is calculated, and a mean value of each linear transform coefficient is calculated according to the linear transformation coefficient, and then the final alpha mask image Q is formed according to the guide image G and the mean value of each linear change coefficient mean.

Figure 3:
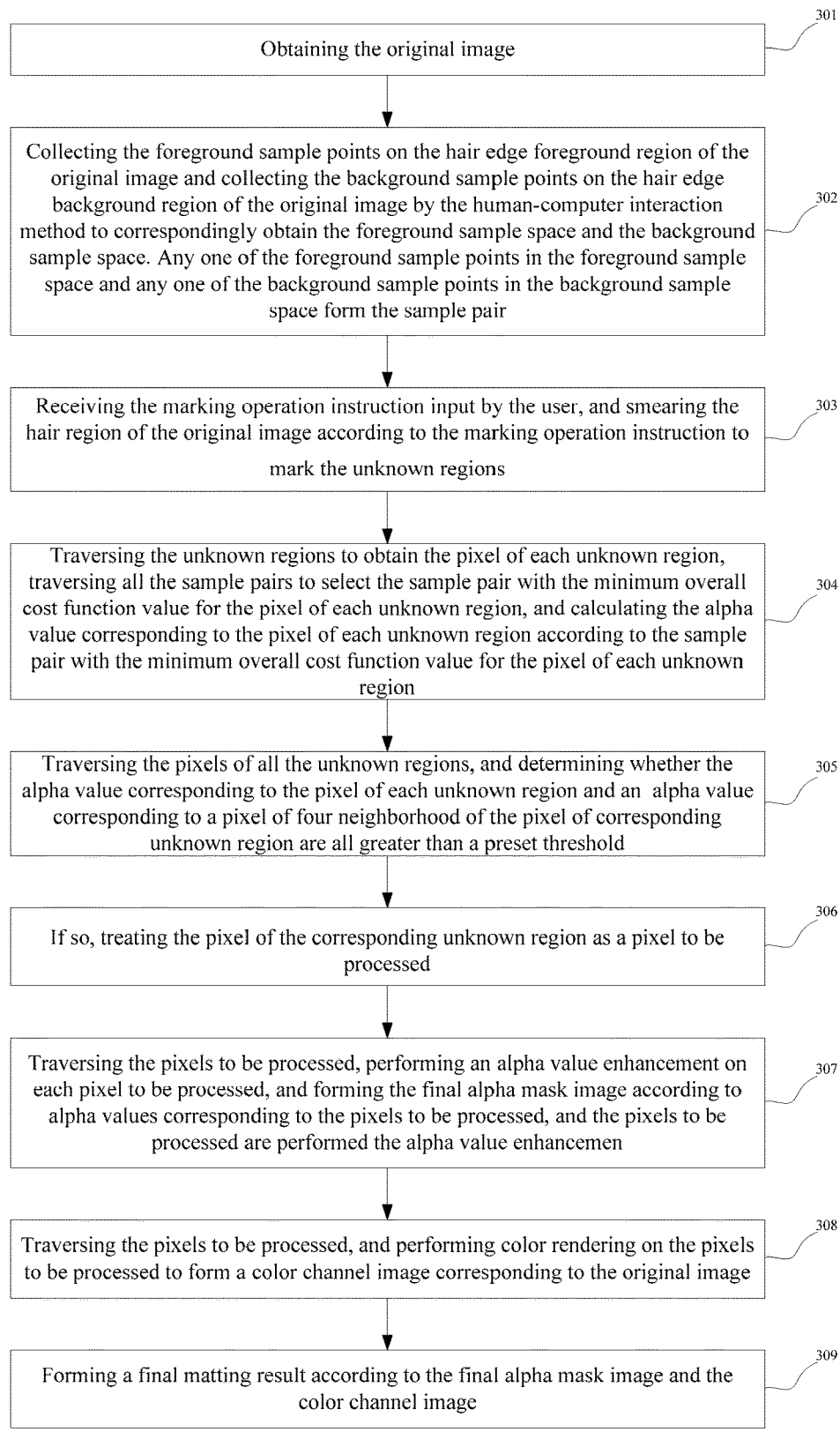
FIG. 3 is a flowchart of a third embodiment of the interactive image matting method of the present disclosure.

In a third embodiment, as shown in FIG. 3, the present disclosure provides the interactive image matting method, including following steps:

S301, obtaining the original image.

S302, collecting the foreground sample points on the hair edge foreground region of the original image and collecting the background sample points on the hair edge background region of the original image by the human-computer interaction method to correspondingly obtain the foreground sample space and the background sample space. Any one of the foreground sample points in the foreground sample space and any one of the background sample points in the background sample space form the sample pair.

S303, receiving the marking operation instruction input by the user, and smearing the hair region of the original image according to the marking operation instruction to mark the unknown regions.

S304, traversing the unknown regions to obtain the pixel of each unknown region, traversing all the sample pairs to select the sample pair with the minimum overall cost function value for the pixel of each unknown region, and calculating the alpha value corresponding to the pixel of each unknown region according to the sample pair with the minimum overall cost function value for the pixel of each unknown region.

The steps S301-S304 are consistent with the steps S101-S104 and the steps S201-S204, and are not repeated herein.

S305, traversing the pixels of all the unknown regions, and determining whether the alpha value corresponding to the pixel of each unknown region and an alpha value corresponding to a 4-neighbor of the pixel of corresponding unknown region are all greater than a preset threshold.

S306, if so, treating the pixel of the corresponding unknown region as a pixel to be processed.

As an example, whether the alpha value corresponding to the pixel of each unknown region and the alpha values corresponding to the 4-neighbors of the pixel of corresponding unknown region are greater than a preset threshold is determined according to following formula:

$$\hat{\alpha} > 255 * \text{threshold};$$

The $\hat{\alpha}$ represents the alpha value corresponding to the pixel of each unknown region or the alpha value corresponding to the 4-neighbor of the pixel of corresponding unknown region. Furthermore, a value of the threshold is 0.8.

S307, traversing the pixels to be processed, performing an alpha value enhancement on each pixel to be processed, and forming the final alpha mask image according to alpha values corresponding to the pixels to be processed, and the pixels to be processed are performed the alpha value enhancement.

The pixels to be processed are traversed, the alpha value enhancement is performed on each pixel to be processed, and the final alpha mask image is formed according to alpha values corresponding to the pixels to be processed. Thus, an influence degree, from the final mask image corresponding to a region of the pixels to be processed to the image, is reduced, and definition of a final image matting result of the region of the pixels to be processed is improved.

There are the plurality of methods to perform the alpha value enhancement on each pixel to be processed.

As an example, the alpha value enhancement is performed on each pixel to be processed according to following formula:

$$\alpha = 255 * e^{\frac{\log(\frac{\hat{\alpha}}{255})}{2.2}};$$

The $\alpha$ represents values of the alpha values corresponding to the pixels to be processed, and the pixels to be processed are performed the alpha value enhancement. The $\hat{\alpha}$ represents original alpha values of the pixels to be processed.

S308, traversing the pixels to be processed, and performing color rendering on the pixels to be processed to form a color channel image corresponding to the original image.

As an example, the color channel image corresponding to the original image is formed according to following formula:

$$I\_b = F_i\_b$$

$$I\_g = F_i\_g$$

$$I\_r = F_i\_r$$

The $F_i$ represents a foreground sample color making the pixels of the unknown regions have the minimum overall cost function value. The $F_i\_b$ represents a blue channel value included in the $F_i$, the $F_i\_g$ represent a green channel value included in the, the $F_i\_r$ represents a red channel value included in the $F_i$, the $I\_b$ represents a blue channel value of the pixels of the unknown regions in the color channel image, the $I\_g$ represents a green channel value of the pixels of the unknown regions in the color channel image, and the $I\_r$ represents a red channel value of the pixels of the unknown regions in the color channel image.

S309, forming a final matting result according to the final alpha mask image and the color channel image.

In view of above, according to the embodiments of the present disclosure, the original image is obtained firstly. The foreground sample points are collected on the hair edge foreground region of the original image by the human-computer interaction method to obtain the foreground sample space, and the background sample points are collected on the hair edge background region of the original image by the human-computer interaction method to obtain the background sample space. Any one of the foreground sample points in the foreground sample space and any one of the background sample points in the background sample space form the sample pair. Then the marking operation instruction input by the user is received, and the hair region of the original image is smeared according to the marking operation instruction to mark the unknown regions. The unknown regions are traversed to obtain the pixel of each unknown region, all the sample pairs are traversed to select the sample pair with the minimum overall cost function value for the pixel of each unknown region, and the alpha value corresponding to the pixel of each unknown region is calculated according to the sample pair with the minimum overall cost function value for the pixel of each unknown region. The alpha mask image is obtained according to the alpha value corresponding to the pixel of each unknown region, and the alpha mask image is processed according to the alpha value corresponding to the pixel of each unknown region to obtain the final alpha mask image. The determination of the sample pairs and the unknown regions is achieved through the simple interaction with the user, and then the alpha value of the pixel of each unknown region is calculated according to corresponding sample pair, so that the user has no need to have the rich technology on the PHOTOSHOP (PS) and the color channel knowledge, but also performs high-quantity matting on the hair edge.

Figure 4:
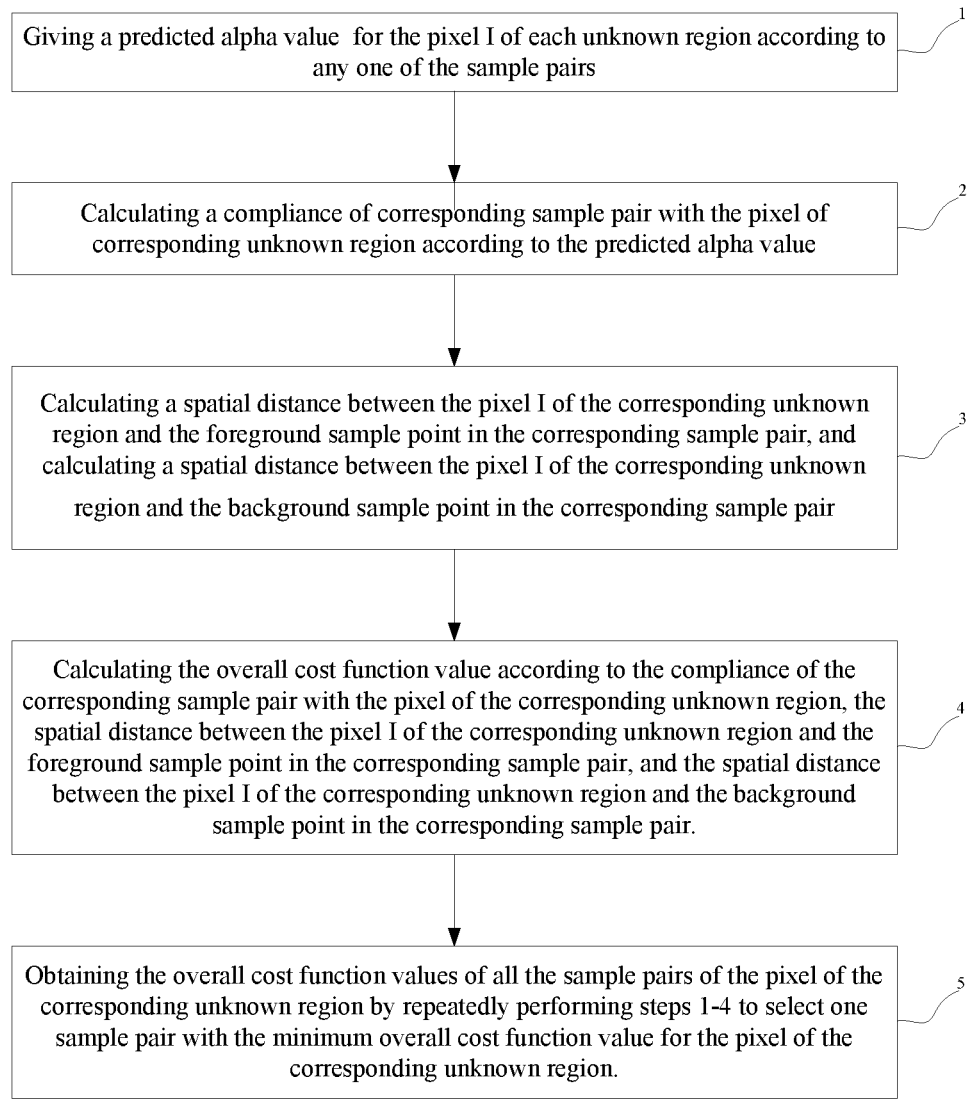
FIG. 4 is a flowchart of a method of selecting one sample pair with a minimum overall cost function value for a pixel of corresponding unknown region of the present disclosure.

As shown in FIG. 4, in one embodiment, the present disclosure provides the interactive image matting method, the steps of traversing all the sample pairs to select the sample pair with the minimum overall cost function value for the pixel of each unknown region are as following:

S1: giving a predicted alpha value $\hat{\alpha}$ for the pixel I of each unknown region according to any one of the sample pairs.

The predicted alpha value $\hat{\alpha}$ for the pixel I of each unknown region is predicted according to the sample pair formed by any one of the foreground sample points and any one of the background sample points.

As an example, the alpha value $\hat{\alpha}$ is obtained according to following formula:

$$\hat{\alpha} = \frac{(I - B_j)(F_i - B_j)}{\|F_i - B_j\|^2}$$

The $F_i$ is the foreground sample point in the corresponding sample pair, and the $B_j$ is the background sample point in the corresponding sample pair.

S2: calculating a compliance of corresponding sample pair with the pixel of corresponding unknown region according to the predicted alpha value $\hat{\alpha}$.

When the predicted alpha value $\hat{\alpha}$ for the pixel I of each unknown region is predicted, the compliance of the corresponding sample pair with the pixel of corresponding unknown region is calculated according to the predicted alpha value $\hat{\alpha}$.

As an example, the compliance of the corresponding sample pair with the pixel of the corresponding unknown region is obtained according to following formula:

$$\varepsilon_c(F_i, B_j) = \|I - (\hat{\alpha} F_i + (1-\hat{\alpha}) B_j)\|$$

The $\varepsilon_c(F_i, B_j)$ is the compliance of the corresponding sample pair with the pixel I of the corresponding unknown region.

S3: calculating a spatial distance between the pixel I of the corresponding unknown region and the foreground sample point in the corresponding sample pair, and calculating a spatial distance between the pixel I of the corresponding unknown region and the background sample point in the corresponding sample pair.

When the compliance of the corresponding sample pair with the pixel of corresponding unknown region is calculated, the spatial distance between the pixel I of the corresponding unknown region and the foreground sample point in the corresponding sample pair is calculated, and the spatial distance between the pixel I of the corresponding unknown region and the background sample point in the corresponding sample pair is calculated.

As an example, the spatial distance between the pixel I of the corresponding unknown region and the foreground sample point in the corresponding sample pair is obtained according to following formula:

$$\varepsilon_s(F_i) = \|X_{F_i} - X_I\|$$

The $\varepsilon_s(F_i)$ is the spatial distance between the pixel I of the corresponding unknown region and the foreground sample point in the corresponding sample pair, the $X_{F_i}$ is a spatial position of the foreground sample point in the corresponding sample pair, and the $X_I$ is a spatial position of the pixel I of the corresponding unknown region.

As an example, the spatial distance between the pixel I of the corresponding unknown region and the background sample point in the corresponding sample pair is calculated according to following formula:

$$\varepsilon_s(B_j) = \|X_{B_j} - X_I\|$$

The $\varepsilon_s(B_j)$ is the spatial distance between the pixel I of the corresponding unknown region and the background sample point in the corresponding sample pair, and the $X_{B_j}$ is a spatial position of the background sample point in the corresponding sample.

S4: calculating the overall cost function value according to the compliance of the corresponding sample pair with the pixel of the corresponding unknown region, the spatial distance between the pixel I of the corresponding unknown region and the foreground sample point in the corresponding sample pair, and the spatial distance between the pixel I of the corresponding unknown region and the background sample point in the corresponding sample pair.

When the compliance of the corresponding sample pair with the pixel of the corresponding unknown region, the spatial distance between the pixel I of the corresponding unknown region and the foreground sample point in the corresponding sample pair, and the spatial distance between the pixel I of the corresponding unknown region and the background sample point in the corresponding sample pair are calculated, the overall cost function value is calculated according to the compliance of the corresponding sample pair with the pixel of the corresponding unknown region, the spatial distance between the pixel I of the corresponding unknown region and the foreground sample point in the corresponding sample pair, and the spatial distance between the pixel I of the corresponding unknown region and the background sample point in the corresponding sample pair.

As an example, the overall cost function value of the corresponding sample pair is obtained according to following formula:

$$\varepsilon(F_i, B_j) = \varepsilon_c(F_i, B_j) + w_1 * \varepsilon_s(F_i) + w_2 * \varepsilon_s(B_j)$$

The $\varepsilon(F_i, B_j)$ is the overall cost function value of the corresponding sample pair, the $w_1$ is a weight of the spatial distance cost function $\varepsilon_s(F_i)$, and the $w_2$ is a weight of the spatial distance cost function $\varepsilon_s(B_j)$.

S5: obtaining the overall cost function values of all the sample pairs of the pixel of the corresponding unknown region by repeatedly performing steps S1-S4 to select one sample pair with the minimum overall cost function value for the pixel of the corresponding unknown region.

In view of above, the present disclosure provide one embodiment of the interactive image matting method. First, the predicted alpha value $\hat{\alpha}$ for the pixel I of each unknown region is predicted according to any one of the sample pairs. Then the compliance of the corresponding sample pair with the pixel of corresponding unknown region is calculated according to the predicted alpha value $\hat{\alpha}$. Then the spatial distance between the pixel I of the corresponding unknown region and the foreground sample point in the corresponding sample pair is calculated, and the spatial distance between the pixel I of the corresponding unknown region and the background sample point in the corresponding sample pair is calculated. Then the overall cost function value is calculated according to the compliance of the corresponding sample pair with the pixel of the corresponding unknown region, the spatial distance between the pixel I of the corresponding unknown region and the foreground sample point in the corresponding sample pair, and the spatial distance between the pixel I of the corresponding unknown region and the background sample point in the corresponding sample pair. Then the overall cost function values of all the sample pairs of the pixel of the corresponding unknown region is obtained by repeatedly performing the steps above to select one sample pair with the minimum overall cost function value for the pixel of the corresponding unknown region. Thus, determination of the sample pair formed by any one of the foreground sample points and any one of the background sample points and the sample pair with the minimum overall cost function value for the pixel of each unknown region is achieved, and a basis for calculating the alpha values corresponding to the pixels of the unknown regions is provided.

In order to achieve the above embodiments, the present disclosure further provides a computer readable memory medium, including an interactive image matting program. The interactive image matting program is configured to be executed by a processor to achieve the interactive image matting method.

The computer readable memory medium stores the interactive image matting program to achieve the interactive image matting method above when the interactive image matting program is executed by the processor. Thus, the determination of the sample pair formed by any one of the foreground sample points and any one of the background sample points and the sample pair with the minimum overall cost function value for the pixel of each unknown region is achieved, and the basis for calculating the alpha values corresponding to the pixels of the unknown regions is is provided.

In order to achieve the above embodiments, the present disclosure further provides a computer device, including a memory, the processor, and the interactive image matting program stored in the memory and configured to be executed by the processor. The interactive image matting program is executed by the processor to achieve the interactive image matting method.

The memory stores the interactive image matting method executed on the program to achieve the interactive image matting method above when the interactive image matting program is performed by the processor. Thus, the determination of the sample pair formed by any one of the foreground sample points and any one of the background sample points and the sample pair with the minimum overall cost function value for the pixel of each unknown region is achieved, and the basis for calculating the alpha values corresponding to the pixels of the unknown regions is is provided.

As will be appreciated by those skilled in the art, embodiments of the present disclosure may be provided as a method, system, or computer program product. Accordingly, the present disclosure may take the form of an entirely hardware embodiment, an entirely software embodiment, or an embodiment combining software and hardware aspects. Moreover, the present disclosure may take the form of a computer program product embodied on one or more computer readable memory medium (including, but not limited to, magnetic disk memory, CD-ROM, optical memory, etc.) having computer readable program code embodied therein.

The present disclosure is described referring to flowchart diagrams or block diagrams of one embodiment of method, apparatus (system), and computer program product. It should be understood that each flowchart diagram and/or each block diagram in the flowchart diagrams and/or block diagrams and a combination of flowcharts and/or blocks in the flowchart diagrams and/or the block diagram may be realized by computer program instructions. These computer program instructions may be provided to a processor of a general purpose computer, special purpose computer, embedded processor, or other programmable data processing apparatus to produce a machine, such that the instructions, which are executed by the processor of the computer or other programmable data processing apparatus, generate devices with specific functions in one flowchart or a plurality of the flowcharts and/or one block or a plurality of the blocks.

These computer program instructions may also be stored in a computer-readable memory that can guide a computer or other programmable data processing devices to work in a particular manner, such that the instructions stored in the computer-readable memory generate an article of manufacture including an instruction device, the instruction device realizes specific functions in one flowchart or a plurality of the flowcharts of the flowchart diagrams and/or one block or a plurality of the blocks of the block diagrams.

These computer program instructions may also be loaded onto the computer or the other programmable data processing devices to cause a series of operational steps to be performed on the computer or other programmable apparatus to produce a computer-realized process such that the instructions which execute on the computer or other programmable apparatus provide steps configured to realize the specific functions in one flowchart or a plurality of the flowcharts of the flowchart diagrams and/or one block or a plurality of the blocks of the block diagrams.

It should be noted that in the claims, any reference symbols located between parentheses shall not be construed as limitations on the claims. The word "comprising" does not exclude the presence of a component or step that is not listed in the claims. The word "a" or "an" before the component does not exclude the presence of multiple such components. The present disclosure may be implemented by means of hardware including several different components and by means of a suitably programmed computer. In a unit claim listing several devices, several of these devices may be embodied by the same hardware item. The use of words first, second, and third, etc. do not denote any order. These words may be interpreted as a name.

While the embodiments of the present disclosure have been described, those skilled in the art, upon attaining a basic inventive concept, may make additional alterations and modifications to these embodiments. Therefore, it is intended that the appended claims be interpreted as including embodiments and all changes and modifications that fall within the scope of the present disclosure.

Obviously, those skilled in the art can make various modifications and variations to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

In the description of the present disclosure, it is to be understood that the terms "first" and "second" are used for descriptive purposes only and are not to be construed as indicating or implying relative importance or implicitly indicating the number of technical features indicated. Thus, a feature defining "first" or "second" may explicitly or implicitly include one or more of the features. In the description of the present disclosure, the meaning of "a plurality of" is two or more unless specifically defined otherwise.

In the present disclosure, unless expressly specified and defined otherwise, the terms "disposed", "connected with", "connected", "fixed" and the like are to be construed broadly, for example, may be fixedly connected, may be detach ably connected, or integral; may be mechanically connected or electrically connected; may be directly connected, may also be indirectly connected by an intermediate medium, or may be an interaction relationship between two elements. Specific meanings of the above-described terms in the present disclosure may be understood by those of ordinary skill in the art based on the specific circumstances.

In the present disclosure, unless expressly specified and defined otherwise, the first feature is "on" or "under" the second feature may be in direct contact with the first and second features, or the first and second features are in indirect contact with the intermediate medium. Furthermore, the first feature "over", "above", and "upper" of the second feature may be that the first feature is above or obliquely above the second feature, or simply indicates that the first feature level height is higher than the second feature. The first feature "beneath", "below", and "lower" may be that the first feature is under or under the second feature, or simply indicates that the first feature level height is less than the second feature.

In the description of this specification, reference to the terms "one embodiment", "some embodiments", "an example", "a specific example", or "some examples" or the like, means that a particular feature, structure, material, or characteristic described in connection with the embodiment or example is included in at least one embodiment or example of the present disclosure. In this specification, a schematic representation of the above term is not to be construed as necessarily referring to the same embodiment or example. Furthermore, the particular features, structures, materials, or characteristics described may be combined in any suitable manner in any one or more embodiments or examples. Furthermore, various embodiments or examples described in this specification, as well as features of different embodiments or examples, may be combined and combined without conflict with each other.

Although the embodiments of the present disclosure have been shown and described above, it should be understood that the above-described embodiments are exemplary and are not to be construed as limitations of the present disclosure, which are within the scopes of the present disclosure that may be varied, modified, substituted, and modified within the scopes of the present disclosure.

What is claimed is:

1. An interactive image matting method, comprising:
   obtaining an original image;
   collecting foreground sample points on a hair edge foreground region of the original image and collecting background sample points on a hair edge background region of the original image by a human-computer interaction method to correspondingly obtain a foreground sample space and a background sample space; wherein any one of the foreground sample points in the foreground sample space and any one of the background sample points in the background sample space form a sample pair;
   receiving a marking operation instruction input by a user, and smearing a hair region of the original image according to the marking operation instruction to mark unknown regions;
   traversing the unknown regions to obtain a pixel of each unknown region, traversing all the sample pairs to select a sample pair with a minimum overall cost function value for the pixel of each unknown region, and calculating an alpha value corresponding to the pixel of each unknown region according to the sample pair with the minimum overall cost function value for the pixel of each unknown region; and
   obtaining an alpha mask image according to the alpha value corresponding to the pixel of each unknown region, and processing the alpha mask image according to the alpha value corresponding to the pixel of each unknown region to obtain a final alpha mask image;
   wherein the step of processing the alpha mask image according to the alpha value corresponding to the pixel of each unknown region to obtain the final alpha mask image comprises:
   traversing the pixels of all the unknown regions, and determining whether the alpha value corresponding to the pixel of each unknown region and the alpha values corresponding to the 4-neighbors of the pixel of each unknown region are all greater than a preset threshold;
   if so, treating the pixel of each unknown region as a pixel to be processed; and
   traversing the pixels to be processed, performing an alpha value enhancement on each pixel to be processed, and forming the final alpha mask image according to alpha values corresponding to the pixels to be processed.

2. The interactive image matting method according to claim 1, wherein the step of obtaining the foreground sample space and the background sample space further comprises:
   receiving a first sample point acquisition instruction input by the user, and collecting the foreground sample points on the hair edge foreground region of the original image according to the first sample point acquisition instruction to obtain a plurality of the foreground sample points, the plurality of the foreground sample points form the foreground sample space; and
   receiving a second sample point acquisition instruction input by the user, and collecting the background sample points on the hair edge background region of the original image according to the second sample point acquisition instruction to obtain a plurality of the background sample points, the plurality of the background sample points form the background sample space.

3. The interactive image matting method according to claim 2, wherein the steps of traversing all the sample pairs to select the sample pair with the minimum overall cost function value for the pixel of each unknown region comprise:
   S1: giving a predicted alpha value $\hat{\alpha}$ for the pixel I of each unknown region according to any one of the sample pairs;
   S2: calculating a compliance of corresponding sample pair with the pixel of corresponding unknown region according to the predicted alpha value;
   S3: calculating a spatial distance between the pixel I of the corresponding unknown region and the foreground sample point in the corresponding sample pair, and calculating a spatial distance between the pixel I of the corresponding unknown region and the background sample point in the corresponding sample pair;
   S4: calculating the overall cost function value according to the compliance of the corresponding sample pair with the pixel of the corresponding unknown region, the spatial distance between the pixel I of the corresponding unknown region and the foreground sample point in the corresponding sample pair, and the spatial distance between the pixel I of the corresponding unknown region and the background sample point in the corresponding sample pair; and
   S5: obtaining the overall cost function values of all the sample pairs of the pixel of the corresponding unknown region by repeatedly performing steps S1-S4 to select one sample pair with the minimum overall cost function value for the pixel of the corresponding unknown region.

4. The interactive image matting method according to claim 1, wherein the steps of traversing all the sample pairs to select the sample pair with the minimum overall cost function value for the pixel of each unknown region comprise:
   S1: giving a predicted alpha value $\hat{\alpha}$ for the pixel I of each unknown region according to any one of the sample pairs;
   S2: calculating a compliance of corresponding sample pair with the pixel of corresponding unknown region according to the predicted alpha value;
   S3: calculating a spatial distance between the pixel I of the corresponding unknown region and the foreground sample point in the corresponding sample pair, and calculating a spatial distance between the pixel I of the corresponding unknown region and the background sample point in the corresponding sample pair;
   S4: calculating the overall cost function value according to the compliance of the corresponding sample pair with the pixel of the corresponding unknown region, the spatial distance between the pixel I of the corresponding unknown region and the foreground sample point in the corresponding sample pair, and the spatial distance between the pixel I of the corresponding unknown region and the background sample point in the corresponding sample pair; and S5: obtaining the overall cost function values of all the sample pairs of the pixel of the corresponding unknown region by repeatedly performing steps S1-S4 to select one sample pair with the minimum overall cost function value for the pixel of the corresponding unknown region.

5. The interactive image matting method according to claim 4, wherein the predicted alpha value $\hat{\alpha}$ is obtained according to following formula:

$$\hat{\alpha} = \frac{(I - B_j)(F_i - B_j)}{\|F_i - B_j\|^2};$$

wherein the $F_i$ is the foreground sample point in the corresponding sample pair, and the $B_j$ is the background sample point in the corresponding sample pair.

6. The interactive image matting method according to claim 5, wherein the compliance of the corresponding sample pair with the pixel I of the corresponding unknown region according to the predicted alpha value is obtained according to following formula:

$$\varepsilon_c(F_i,B_j)=\|I-(\hat{\alpha}F_i+(1-\hat{\alpha})B_j)\|;$$

wherein the $\varepsilon_c(F_i, B_j)$ is the compliance of the corresponding sample pair with the pixel I of the corresponding unknown region.

7. The interactive image matting method according to claim 6, wherein the spatial distance between the pixel I of the corresponding unknown region and the foreground sample point in the corresponding sample pair is obtained according to following formula:

$$\varepsilon_s(F_i)=\|X_{F_i}-X_I\|;$$

wherein the $\varepsilon_s(F_i)$ is the spatial distance between the pixel I of the corresponding unknown region and the foreground sample point in the corresponding sample pair, the $X_{F_i}$ is a spatial position of the foreground sample point in the corresponding sample pair, and the $X_I$ is a spatial position of the pixel I of the corresponding unknown region.

8. The interactive image matting method according to claim 7, wherein the spatial distance between the pixel I of the corresponding unknown region and the background sample point in the corresponding sample pair is obtained according to following formula:

$$\varepsilon_s(B_j)=\|X_{B_j}-X_I\|;$$

wherein the $\varepsilon_s(B_j)$ is the spatial distance between the pixel I of the corresponding unknown region and the background sample point in the corresponding sample pair, and the $X_{B_j}$ is a spatial position of the background sample point in the corresponding sample.

9. The interactive image matting method according to claim 8, wherein the overall cost function value of the corresponding sample pair is obtained according to following formula:

$$\varepsilon(F_i,B_j)=\varepsilon_c(F_i,B_j)+w_1*\varepsilon_s(F_i)+w_2*\varepsilon_s(B_j);$$

wherein the $\varepsilon(F_i, B_j)$ is the overall cost function value of the corresponding sample pair, the $w_1$ is a weight of the spatial distance cost function $\varepsilon_s(F_i)$, and the $w_2$ is a weight of the spatial distance cost function $\varepsilon_s(B_j)$.

10. The interactive image matting method according to claim 1, wherein the step of processing the alpha mask image according to the alpha value corresponding to the pixel of each unknown region to obtain the final alpha mask image comprises;

denoising the alpha mask image according to the alpha value corresponding the pixel of each unknown region to obtain the final alpha mask image.

11. The interactive image matting method according to claim 1, wherein performing the alpha value enhancement on each pixel to be processed is done according to following formula:

$$\alpha = 255*e^{\frac{\log(\frac{\hat{\alpha}}{255})}{2.2}};$$

wherein the $\alpha$ represents values of the alpha values corresponding to the pixels to be processed, and the pixels to be processed are performed the alpha value enhancement; the $\hat{\alpha}$ represents original alpha values of the pixels to be processed.

12. The interactive image matting method according to claim 1, wherein the step of processing the alpha mask image according to the alpha value corresponding to the pixel of each unknown region to obtain the final alpha mask image further comprises:

traversing the pixels to be processed, and performing color rendering on the pixels to be processed to form a color channel image corresponding to the original image; and forming a final matting result according to the final alpha mask image and the color channel image.

13. A computer readable memory medium, comprising an interactive image matting program; wherein the interactive image matting program is configured to be executed by a processor to achieve the interactive image matting method, and the interactive image matting method comprises following steps:

obtaining an original image;

collecting foreground sample points collection on a hair edge foreground region of the original image and collecting background sample points on a hair edge background region of the original image by a human-computer interaction method to correspondingly obtain a foreground sample space and a background sample space; wherein any one of the foreground sample points in the foreground sample space and any one of the background sample points in the background sample space form a sample pair;

receiving a marking operation instruction input by a user, and smearing a hair region of the original image according to the marking operation instruction to mark unknown regions;

traversing the unknown regions to obtain a pixel of each unknown region, traversing all the sample pairs to select a sample pair with a minimum overall cost function value for the pixel of each unknown region, and calculating an alpha value corresponding to the pixel of each unknown region according to the sample pair with the minimum overall cost function value for the pixel of each unknown region; and obtaining an alpha mask image according to the alpha value corresponding to the pixel of each unknown region, and processing the alpha mask image according to the alpha value corresponding to the pixel of each unknown region to obtain a final alpha mask image;

wherein the step of processing the alpha mask image according to the alpha value corresponding to the pixel of each unknown region to obtain the final alpha mask image comprises:

traversing the pixels of all the unknown regions, and determining whether the alpha value corresponding to the pixel of each unknown region and the alpha values corresponding to the 4-neighbors of the pixel of each unknown region are all greater than a preset threshold;

if so, treating the pixel of each unknown region as a pixel to be processed; and traversing the pixels to be processed, performing an alpha value enhancement on each pixel to be processed, and forming the final alpha mask image according to alpha values corresponding to the pixels to be processed.

14. A computer device, comprising a memory, a processor, and an interactive image matting program stored in the memory and configured to be executed by the processor; wherein the interactive image matting program is executed by the processor to achieve an interactive image matting method, and the interactive image matting method comprises following steps:

obtaining an original image;

collecting foreground sample points on a hair edge foreground region of the original image and collecting background sample points on a hair edge background region of the original image by a human-computer interaction method to correspondingly obtain a foreground sample space and a background sample space; wherein any one of foreground sample points in the foreground sample space and any one of background sample points in the background sample space form a sample pair;

receiving a marking operation instruction input by a user, and smearing a hair region of the original image according to the marking operation instruction to mark unknown regions;

traversing the unknown regions to obtain a pixel of each unknown region, traversing all the sample pairs to select a sample pair with a minimum overall cost function value for the pixel of each unknown region, and calculating an alpha value corresponding to the pixel of each unknown region according to the sample pair with the minimum overall cost function value for the pixel of each unknown region; and obtaining an alpha mask image according to the alpha value corresponding to the pixel of each unknown region, and processing the alpha mask image according to the alpha value corresponding to the pixel of each unknown region to obtain a final alpha mask image;

wherein the step of processing the alpha mask image according to the alpha value corresponding to the pixel of each unknown region to obtain the final alpha mask image comprises:

traversing the pixels of all the unknown regions, and determining whether the alpha value corresponding to the pixel of each unknown region and the alpha values corresponding to the 4-neighbors of the pixel of each unknown region are all greater than a preset threshold;

if so, treating the pixel of each unknown region as a pixel to be processed; and traversing the pixels to be processed, performing an alpha value enhancement on each pixel to be processed, and forming the final alpha mask image according to alpha values corresponding to the pixels to be processed.

15. The computer device according to claim 14, wherein the step of obtaining foreground sample space and background sample space further comprises:

receiving a first sample point acquisition instruction input by the user, and performing the foreground sample point collection on the hair edge foreground region of the original image according to the first sample point acquisition instruction to obtain a plurality of the foreground sample points; and receiving a second sample point acquisition instruction input by the user, and performing the background sample point collection on the hair edge background region of the original image according to the second sample point acquisition instruction to obtain a plurality of the background sample points.

16. The computer device according to claim 15, wherein the steps of traversing all the sample pairs to select the sample pair with the minimum overall cost function value for the pixel of each unknown region comprise:

S1: giving a predicted alpha value $\hat{\alpha}$ for the pixel I of each unknown region according to any one of the sample pairs;

S2: calculating a compliance of corresponding sample pair with the pixel of corresponding unknown region according to the predicted alpha value;

S3: calculating a spatial distance between the pixel I of the corresponding unknown region and the foreground sample point in the corresponding sample pair, and calculating a spatial distance between the pixel I of the corresponding unknown region and the background sample point in the corresponding sample pair;

S4: calculating the overall cost function value according to the compliance of the corresponding sample pair with the pixel of the corresponding unknown region, the spatial distance between the pixel I of the corresponding unknown region and the foreground sample point in the corresponding sample pair, and the spatial distance between the pixel I of the corresponding unknown region and the background sample point in the corresponding sample pair; and S5: obtaining the overall cost function values of all the sample pairs of the pixel of the corresponding unknown region by repeatedly performing steps S1-S4 to select one sample pair with the minimum overall cost function value for the pixel of the corresponding unknown region.

17. The computer device according to claim 16, wherein the predicted alpha value $\hat{\alpha}$ is obtained according to following formula:

$$\hat{\alpha} = \frac{(I - B_j)(F_i - B_j)}{\|F_i - B_j\|^2};$$

wherein the $F_i$ is the foreground sample point in the corresponding sample pair, and the $B_j$ is the background sample point in the corresponding sample pair.

18. The computer device according to claim 17, wherein the compliance of corresponding sample pair with the pixel I of corresponding unknown region according to the predicted alpha value is obtained according to following formula:

$$\varepsilon_c(F_i, B_j) = \|I - (\hat{\alpha}F_i + (1-\hat{\alpha})B_j)\|;$$

wherein the $\varepsilon_c(F_i, B_j)$ is the compliance of corresponding sample pair with the pixel I of corresponding unknown region.

19. The computer device according to claim 18, wherein the spatial distance between the pixel I of the corresponding unknown region and the foreground sample point in the corresponding sample pair is obtained according to following formula:

$$\varepsilon_s(F_i) = \|X_{F_i} - X_I\|;$$

wherein the $\varepsilon_s(F_i)$ is the spatial distance between the pixel I of the corresponding unknown region and the foreground sample point in the corresponding sample pair, the $X_{F_i}$ is a spatial position of the foreground sample point in the corresponding sample pair, and the $X_I$ is a spatial position of the pixel I of the corresponding unknown region.

\* \* \* \* \*